US007069897B2

(12) United States Patent
Yanagimoto et al.

(10) Patent No.: US 7,069,897 B2
(45) Date of Patent: Jul. 4, 2006

(54) FORGED PISTON FOR INTERNAL COMBUSTION ENGINE AND MANUFACTURING METHOD THEREOF

(75) Inventors: Shigeru Yanagimoto, Kitakata (JP); Masashi Fukuda, Kitakata (JP); Masahiro Sato, Kitakata (JP)

(73) Assignee: Showa Denko K.K., Tokyo (JP)

( * ) Notice: Subject to any disclaimer, the term of this patent is extended or adjusted under 35 U.S.C. 154(b) by 74 days.

(21) Appl. No.: 10/484,503

(22) PCT Filed: Jul. 23, 2002

(86) PCT No.: PCT/JP02/07428

§ 371 (c)(1), (2), (4) Date: Aug. 16, 2004

(87) PCT Pub. No.: WO03/010429

PCT Pub. Date: Feb. 6, 2003

(65) Prior Publication Data

US 2004/0261615 A1 Dec. 30, 2004

Related U.S. Application Data

(60) Provisional application No. 60/308,110, filed on Jul. 30, 2001.

(30) Foreign Application Priority Data

Jul. 23, 2001 (JP) ............................ 2001-221005

(51) Int. Cl.
*F02F 3/00* (2006.01)
*F16J 1/04* (2006.01)
*B23P 15/10* (2006.01)

(52) U.S. Cl. .................. 123/193.6; 92/208; 29/888.04

(58) Field of Classification Search ............. 123/193.4, 123/193.6; 92/208, 222, 223; 29/888.04, 29/888.047, 888.048, 888.049; 428/650, 428/925

See application file for complete search history.

(56) References Cited

U.S. PATENT DOCUMENTS

| | | | | |
|---|---|---|---|---|
| 4,633,764 | A * | 1/1987 | Kohnert | 92/208 |
| 5,648,620 | A * | 7/1997 | Stenzel et al. | 123/193.5 |
| 6,428,909 | B1 * | 8/2002 | Oketani et al. | 29/888.04 |

FOREIGN PATENT DOCUMENTS

| | | | | |
|---|---|---|---|---|
| EP | 0715915 | A1 | 6/1996 | |
| EP | 0870919 | A1 | 10/1998 | |
| EP | 0971117 | A2 | 1/2000 | |
| JP | 54-42847 | B2 | 12/1979 | |
| JP | 6-279904 | A | 10/1994 | |
| JP | 09-174198 | A | 7/1997 | |
| JP | 2000-179399 | * | 6/2000 | 29/888.04 |

* cited by examiner

*Primary Examiner*—Willis R. Wolfe, Jr.
(74) *Attorney, Agent, or Firm*—Sughrue Mion, PLLC

(57) ABSTRACT

A forged piston for an internal combustion engine formed from an aluminum alloy containing silicon in an amount of 6 to 25 mass %, includes an oil ring groove section (12) and a skirt section (13). The ratio (A/B) of the average size (A) of eutectic silicon grains contained in the oil ring groove section to the average size (B) of eutectic silicon grains contained in the frontal end portion (18) of the skirt section is at least 1.5. The average size (A) is at least 4 μm. With the configuration such that the average size (B) is small and that the average size (A) is large, the skirt section exhibits excellent forgeability and the oil ring groove section exhibits reliable mechanical workability and improved wear resistance.

8 Claims, 4 Drawing Sheets

FORGED PISTON FOR INTERNAL COMBUSTION ENGINE AND MANUFACTURING METHOD THEREOF

CROSS REFERENCE TO RELATED APPLICATIONS

This application is an application filed under 35 U.S.C. § 111(a) claiming the benefit pursuant to 35 U.S.C. § 119(e) (1) of the filing date of Provisional Application No. 60/308,110 filed Jul. 30, 2001 pursuant to 35 U.S.C. §111(b)

TECHNICAL FIELD

The present invention relates to a forged piston for an internal combustion engine formed from an aluminum-silicon alloy, and to a method for manufacturing the piston.

BACKGROUND ART

Conventionally, pistons for internal combustion engines have been produced through permanent mold casting. Firstly, molten aluminum alloy is teemed into a casting mold to thereby mold the alloy into a piston preform. Subsequently, the resultant preform is subjected to heat treatment as required, such as intentional aging, and then subjected to mechanical working as required to thereby produce a final product.

Recently, in some cases, pistons for internal combustion engines have been produced through forging. Molten aluminum-silicon alloy is subjected to continuous casting to thereby form a billet for extrusion; the billet is subjected to heat treatment (homogenizing treatment) in order to attain uniform distribution of internal stress generated by segregation of solute elements or shrinkage during solidification; and the resultant billet is formed into a round bar of small diameter through extrusion. Alternatively, molten aluminum-silicon alloy is subjected to continuous casting to thereby form a continuously cast bar of small diameter; the resultant cast bar is subjected to homogenizing treatment; and the resultant bar is subjected to machining to thereby form a round bar of small diameter. The thus formed round bar of small diameter is cut into pieces serving as a forging material. The forging material is preliminarily heated, and then forged into a piston preform by use of a hot-forging machine. Subsequently, the preform is subjected to heat treatment, such as intentional aging, and then subjected to mechanical working to thereby produce a final product (i.e., a piston). In accordance with use of the piston, in order to improve wear resistance and heat resistance, the head of the piston or a portion of the side wall of the piston between a top ring and the head may be subjected to alumite treatment or coating formation treatment.

Recently, demand has arisen for further improvement in fuel economy of internal combustion engines employed in, for example, automobiles. In order to meet such demand, attempts have been made to reduce the weight of an automobile body, and lightweight engines have been developed. For example, pistons employed in engines have been produced from aluminum, and pistons of thin wall structure have been developed.

Meanwhile, there has arisen demand for pistons of high quality that meet requirements of high-performance engines.

When a piston is produced through a conventional permanent mold casting method, because of technical limitation imposed on the casting method, the thickness of a skirt section is difficult to reduce. Therefore, in general, the cast piston is subjected to machining to thereby reduce the thickness of the skirt section. When a piston is produced through casting, the metallographic structure of the piston become coarse as a result of low solidification rate during casting, so that the resultant piston exhibits good mechanical workability. However, since variation in thickness and dimension between pistons formed through casting is large, dimensional accuracy of final products is difficult to control. Furthermore, internal defects, such as cavities and microshrinkage, may arise in a piston produced through casting, thereby lowering its strength. Therefore, in order to improve the strength of the piston, the entire wall of the piston is thickened and the thickness of a rib is increased, thereby making a piston produced through casting unsuitable for use in an engine of high performance. In addition, variation in performance between pistons becomes large due to thickening of the wall of the pistons. In view of the foregoing, producing engines of reliable performance requires further improvement of pistons.

Meanwhile, when a piston is produced from a forging material through forging, the thicknesses of sections constituting the piston become uniform, since the forging material contains substantially no internal defects, and the forging material has reliable mechanical characteristics. Therefore, a piston of reliable quality can be produced through forging. However, since the forging material has a fine metallographic structure, mechanical workability of the material is not satisfactory, although the material is suitable for forging of a thin, long section, such as a skirt section. For example, since chips of continuous form, as contrasted to fragmental form, are generated during mechanical working, manageability of the chips is impaired, resulting in poor productivity. In addition, the surface roughness of an oil ring groove section of a final piston product that has undergone mechanical working is not satisfactory. When continuous casting is employed, in order to prevent occurrence of cracking attributed to solidification-shrinkage stress generated in a cast ingot during casting, a limitation is imposed on the composition of the alloy to be produced. Therefore, an alloy of desired composition which serves as a forging material capable of providing a piston exhibiting higher strength, higher wear resistance and higher strength at high temperature than required cannot be produced easily.

In view of the foregoing, the present invention has been developed, and the object thereof is to provide a forged piston for an internal combustion engine, including an oil ring groove exhibiting improved mechanical workability (e.g., the oil ring groove exhibiting reliable dimensional accuracy in terms of surface roughness and flatness), a head section having excellent mechanical characteristics (e.g., a head surface and a piston pin portion constituting the head section exhibiting excellent mechanical strength characteristics at high temperature), a skirt section exhibiting excellent forgeability, and an oil ring groove section exhibiting reliable wear resistance.

DISCLOSURE OF THE INVENTION

The present invention provides a forged piston for an internal combustion engine formed from an aluminum alloy containing silicon in an amount of 6 to 25 mass %, the piston comprising an oil ring groove section and a skirt section, wherein a ratio (A/B) of an average size (A) of eutectic silicon grains contained in the oil ring groove section to an average size (B) of eutectic silicon grains contained in a frontal end portion of the skirt section, is at least 1.5, and the average size (A) is at least 4 μm.

The forged piston includes a forged piston in which a ratio (C/D) of an average size (C) of primary silicon crystal grains contained in the oil ring groove section to an average size (D) of primary silicon crystal grains contained in the frontal end portion of the skirt section is at least 1.3, and the average size (C) is at least 15 μm.

In each of the forged pistons, the aluminum alloy contains Cu in an amount of 0.3 to 7 mass % and Mg in an amount of 0.1 to 2 mass %.

Any one of the aluminum alloys can contain Ni in an amount of 0.1 to 2.5 mass %.

The present invention also provides a method for manufacturing a forged piston for an internal combustion engine, comprising the steps of:

subjecting to unidirectional solidification casting molten aluminum alloy containing silicon in an amount of 6 to 25 mass % to thereby produce a cast ingot which serves as a forging material having a first surface and a second surface which are opposed to each other, an average size of silicon grains contained in the first surface differing from that of silicon grains contained in the second surface;

subjecting the forging material to preliminary heating;

placing the forging material in a forging die, with the surface containing silicon grains of larger average size facing a surface of the die that corresponds to a piston head, to thereby forge the forging material into a piston preform;

subjecting the piston preform to intentional aging treatment; and subjecting the resultant piston preform to mechanical working to thereby manufacture a forged piston for an internal combustion engine.

In the manufacturing method, the unidirectional solidification casting comprises cooling carried out to obtain a ratio (A/B) of an average size (A) of eutectic silicon grains contained in an upper portion of the cast ingot to a average size (B) of eutectic silicon grains contained in a portion of the cast ingot that is close to a cooling plate, which ratio (A/B) is at least 1.5, the average size (A) being at least 4 μm.

In the manufacturing method, the unidirectional solidification casting comprises cooling carried out under a cooling rate (E) as measured at a point e 5 mm downward from a ceiling of a solidification mold and 5 mm inward from a side wall of the solidification mold, which cooling rate (E) is at least 0.5° C./second, to obtain a ratio (E/F) of the cooling rate (E) as measured at the point e to a cooling rate (F) as measured at a point f 1 mm upward from a bottom of the solidification mold and 5 mm inward from the side wall of the solidification mold, which ratio (E/F) is 0.85 or less.

In any of the manufacturing methods, the preliminary heating is carried out at a temperature falling within a range of 350° C. to the difference obtained by deducting 10° C. from the solidus temperature (° C.) of the aluminum alloy.

As described above, according to the present invention, there can be produced a forged piston for an internal combustion engine including an oil ring groove section and a skirt section, in which the average sizes of eutectic and primary silicon grains contained in the frontal end portion of the skirt section are small, and the average sizes of eutectic and primary silicon grains contained in the oil ring groove section are large. With this configuration, the skirt section exhibits excellent forgeability as in the case of a skirt section of a piston formed from a continuously cast bar of small diameter, and thus the thickness of the skirt section can be reduced. In addition, the oil ring groove section exhibits excellent manageability of chips during milling as in the case of an oil ring groove section of a piston formed through casting, and the oil ring groove has a small surface roughness and exhibits excellent wear resistance.

BRIEF DESCRIPTION OF THE DRAWINGS

FIG. 1(*b*) is a vertical cross section schematically showing the forged piston of FIG. 1(*a*), which includes the cross section of a piston pinhole.

FIG. 4(*b*) is a plan view of the tool of FIG. 4(*a*).

FIG. 4(*c*) is a front view of the tool of FIG. 4(*a*).

BEST MODE FOR CARRYING OUT THE INVENTION

An embodiment of the forged piston for an internal combustion engine according to the present invention will now be described.

The forged piston for an internal combustion engine of the present invention includes a head surface having a valve recess, a skirt section of large thickness, a rib, an oil ring groove section and a piston pinhole.

Figures 1A, 1B:
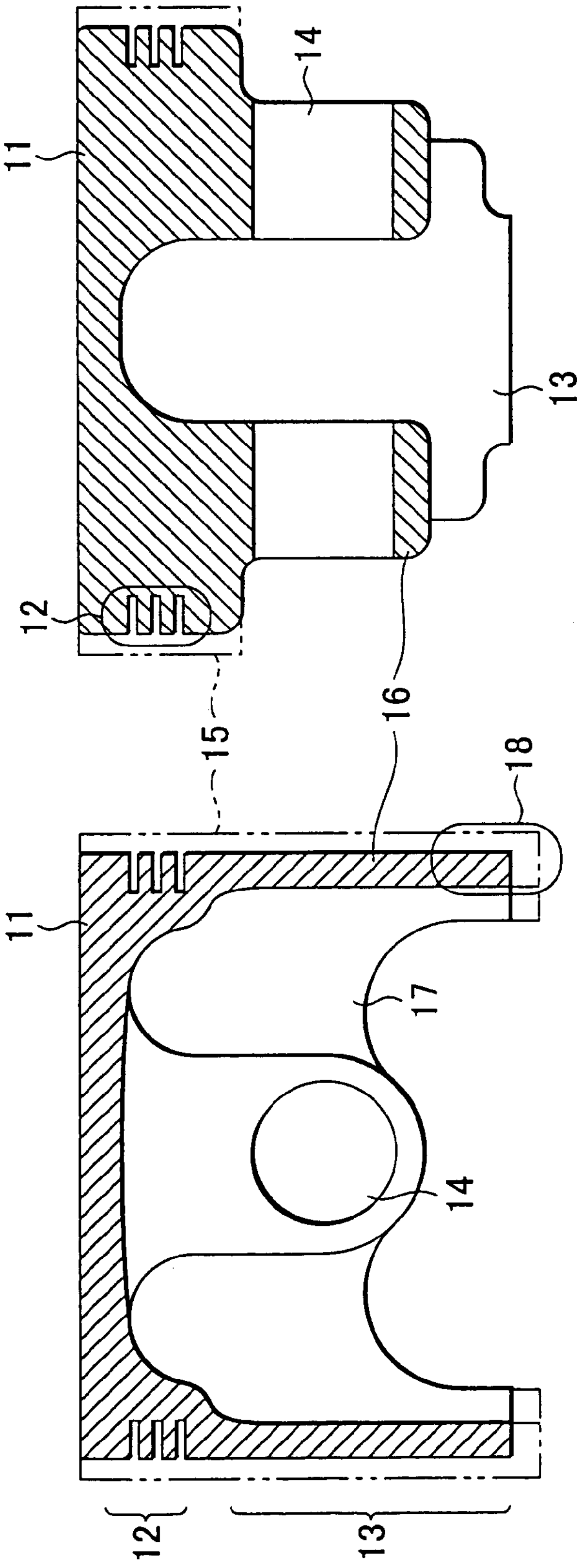
FIG. 1(*a*) is a vertical cross section schematically showing an embodiment of the forged piston for an internal combustion engine according to the present invention, which includes the cross section of a skirt section.

FIG. 1 shows cross-sectional views of an embodiment of the forged piston for an internal combustion engine of the present invention. FIG. 1(*a*) is a vertical cross section of the forged piston, which includes the cross section of a skirt section 13. FIG. 1(*b*) is a vertical cross section of the forged piston, which includes the cross section of a piston pinhole 14 in which a piston pin for connecting the piston to a connecting rod is inserted. The upper surface of the piston is a head surface 11 having a valve recess. Oil ring grooves 12 serve as grooves for mating piston rings. The oil ring grooves must be provided in a direction perpendicular to the peripheral wall of the piston, i.e., in a direction perpendicular to the vertical direction. The skirt section 13 serves as a guide for maintaining the position of the piston in a cylinder liner and is required to exhibit high strength and high wear resistance. In order to reduce the weight of the piston, the skirt section is required to have a reduced thickness. The profile of a piston preform (i.e., a forged product) is outlined using a two-dot chain line indicated by reference numeral 15. The profile of a piston final product that has undergone mechanical working is outlined using a solid line indicated by reference numeral 16. Reference numeral 17 represents a rib, and numeral 18 represents the frontal end portion of the skirt section 13. The height of the frontal end portion of the skirt section as measured from the bottom of the piston is 40% the overall height of the piston. Since considerable plastic flow occurs in the frontal end portion during forging, the frontal end portion is required to exhibit excellent forgeability.

The forged piston for an internal combustion engine of the present invention is formed from an aluminum alloy containing silicon in an amount of 6 to 25 mass %. A characteristic feature of the forged piston resides in that the ratio (A/B) of the average size (A) of eutectic silicon grains contained in the oil ring groove section 12 to the average size (B) of eutectic silicon grains contained in the frontal end portion 18 of the skirt section 13 is at least 1.5 (preferably at least 1.6) and that the average size (A) is at least 4 μm, preferably at least 4.5 μm.

In the case where the average size (A) is less than 4 μm, when the oil ring groove section is subjected to milling, milling tools and the chuck of a milling machine tend to be entangled with chips of elongated form. The thus entangled chips scratch the surface of the piston to be milled. In addition, chips accumulate to form filamentary mass on the bottom of the milling machine until the chips cover the entirety of the chuck, so that the milling machine can no longer operate, resulting in poor productivity. The forged piston that has undergone milling by use of the milling machine entangled with the chips exhibits large surface roughness, meaning that the quality of the forged piston is not satisfactory.

Since the oil ring groove section 12 is continuous along the entire periphery of the piston, the resultant chips of elongated form require themselves to be fragmented. Therefore, good manageability of chips is required.

In the forged piston for an internal combustion engine of the present invention, the average size of eutectic silicon grains contained in the oil ring groove section is at least 4 μm. Therefore, when the oil ring groove section is subjected to mechanical working, the resultant chips are easily fragmented into small chips by means of silicon crystals. As a result, entanglement of the chips in milling tools or a chuck can be prevented. In addition, since accumulation of filamentary chips in a milling machine can be prevented, manageability of the chips is considerably improved. Furthermore, since entanglement of chips in milling tools or in a product under milling can be prevented, the thus milled product exhibits a stabilized surface roughness.

Since the average size (A) of eutectic silicon grains contained in the oil ring groove section is at least 4 μm, the oil ring groove section exhibits excellent wear resistance. The upper and lower surfaces of the oil ring groove are rubbed with a piston ring during operation of an engine, and thus the oil ring groove section must exhibit high wear resistance. The piston head surface (i.e., a surface exposed to a combustion room of the engine) is heated by high-temperature combustion gas generated during combustion of a fuel, and the temperature in the vicinity of the piston head increases. As compared with the skirt section, the oil ring groove section, which is provided in the vicinity of the piston head and is brought into contact with the inner wall of an engine cylinder, is operated under more stringent conditions. Therefore, the oil ring groove section must exhibit excellent wear resistance. When the average size (A) is less than 4 μm, the wear resistance of the section becomes insufficient.

In the forged piston for an internal combustion engine of the present invention, the average size of eutectic silicon grains contained in the oil ring groove section is at least 4 μm. Therefore, the oil ring groove section exhibits sufficient wear resistance without the vicinity of the oil ring groove being subjected to any treatment for improving wear resistance, such as hard-alumite treatment or coating treatment by use of a wear-resistance coating agent, which is carried out in an engine of high performance. Thus, in the present invention, since such high-cost treatment is not required, cost per piston can be reduced, whereby an inexpensive engine can be provided.

The ratio (A/B) of the average size (A) of eutectic silicon grains contained in the oil ring groove section to the average size (B) of eutectic silicon grains contained in the frontal end portion of the skirt section is preferably at least 1.5, more preferably at least 1.6. In other words, the average size (B) is smaller than the average size (A) and the average size (B) is 0.67 times or less the average size (A), for the reasons described below.

The skirt section 13 is not continuous along the entire periphery of the piston and is segmented by the piston pin section. Therefore, when the skirt section is subjected to milling in a circumferential direction during the course of mechanical working, milling of the skirt section becomes discontinuous, and thus entanglement of chips in milling tools can be prevented. Therefore, so long as the average size (B) of the eutectic silicon grains contained in the frontal end portion 18 of the skirt section is 0.67 times or less the average size (A), satisfactory manageability of chips during mechanical working can be attained.

In contrast, when the average size (B) exceeds 0.67 times the average size (A), excellent plastic flow of the skirt section during hot forging may fail to be attained while wear resistance of the oil ring groove is maintained. For example, there may arise the problem in that wear resistance of the oil ring groove section is impaired although excellent plastic workability of the skirt section can be maintained, or in that plastic workability of the skirt section is impaired although the oil ring groove section exhibits excellent wear resistance. As a result, provision of a piston including an oil ring groove section exhibiting excellent wear resistance and a skirt section exhibiting excellent plastic workability becomes difficult.

However, in the forged piston for an internal combustion engine of the present invention, the average size (B) of eutectic silicon grains contained in the frontal end portion of the skirt section is 0.67 times or less the average size (A) of eutectic silicon grains contained in the oil ring groove section. Therefore, even when the thickness of the skirt section is reduced, cracking is not generated in the frontal end portion of the skirt section that is placed in a forging die, and plastic fluidity of the frontal end portion in the forging die is not impaired. Thus, since the thickness of the skirt section can be reduced, the weight of the piston can be easily reduced. Since a skirt section of decreased thickness can be formed through forging and since the amount of allowance required for mechanical working can be reduced, productivity and yield of the piston on the basis of the material can be improved.

In the forged piston for an internal combustion engine of the present invention formed from an aluminum alloy containing silicon in an amount of 6 to 25 mass %, preferably, the ratio (A/B) of the average size (A) of eutectic silicon grains contained in the oil ring groove section to the average size (B) of eutectic silicon grains contained in the frontal end portion of the skirt section is at least 1.5, with the average size being at least 4.0 μm, and the ratio (C/D) of the average size (C) of primary silicon crystal grains contained in the oil ring groove section to the average size (D) of primary silicon crystal grains contained in the frontal end portion of the skirt section is at least 1.3, with the average size (C) being at least 15 μm.

Why the ratio (A/B) is set to be at least 1.5, with the average size (A) being at least 4 μm, is as described above.

In some cases, an aluminum alloy containing silicon in an amount of 6 to 25 mass % has, depending on the cooling rate of the alloy, a metallographic structure in which primary silicon crystal grains are dispersed in eutectic silicon texture.

In such a case, the average size (C) of primary silicon crystal grains contained in the oil ring groove section is preferably at least 15 μm, more preferably at least 17 μm. This can further enhance mechanical workability and wear resistance of the oil ring groove section. However, when the average size (C) is less than 15 μm, the effects of the primary silicon crystal grains may fail to be obtained sufficiently.

In the forged piston for an internal combustion engine of the present invention, the average size (A) of eutectic silicon grains contained in the oil ring groove section is at least 4.0 μm, and the average size (C) of primary silicon crystal grains contained in the section is at least 15 μm. Therefore, when the oil ring groove section is subjected to mechanical working, the resultant chips are easily fragmented into small chips by means of silicon crystals. As a result, entanglement of the chips in milling tools or a chuck can be prevented. In addition, since accumulation of filamentary chips in a milling machine can be prevented, manageability of the chips is improved considerably. Furthermore, since entanglement of chips in milling tools or in a product undergoing milling can be prevented, the thus milled product exhibits a reliable surface roughness. Since the average size (C) of primary silicon crystal grains contained in the oil ring groove section is at least 15 μm, the oil ring groove section exhibits improved wear resistance.

The ratio (C/D) of the average size (C) of primary silicon crystal grains contained in the oil ring groove section to the average size (D) of primary silicon crystal grains contained in the frontal end portion of the skirt section is preferably at least 1.3, more preferably at least 1.4, for the reasons described below. When the ratio (C/D) is at least 1.3, wear resistance and mechanical workability of the oil ring groove section can be further improved, and plastic fluidity of the frontal end portion of the skirt section can be maintained. In contrast, when the ratio (C/D) is less than 1.3, the oil ring groove section is impaired in wear resistance and mechanical workability, or the frontal end portion of the skirt section is impaired in plastic fluidity.

Preferably, the aluminum alloy employed for forming the piston further contains Cu in an amount of 0.3 to 7 mass % (more preferably 0.4 to 6.5 mass %) and Mg in an amount of 0.1 to 2 mass % (more preferably 0.15 to 1.8 mass %). Incorporation of such alloy elements enhances hardness of the piston, as well as mechanical strength characteristics of the piston that include tensile strength, 0.2% yield strength and fatigue strength. In addition, since a piston of thin wall structure can be produced, the weight of the piston can be reduced. When the amounts of the alloy elements fall below the lower values, the effects of the elements fail to be obtained. In contrast, when the amounts of the alloy elements exceed the upper values, effects commensurate with the additional amounts of the elements are no longer obtained, material costs increase, and forgeability of the piston is impaired.

Preferably, the aluminum alloy employed for forming the piston further contains Ni in an amount of 0.1 to 2.5 mass % (more preferably 0.2 to 2.0 mass %), for the reasons described below. Incorporation of Ni enhances strength of the piston at high temperature and improves durability of the oil ring groove section, which is provided in the vicinity of the piston head and is brought into contact with the inner wall of an engine cylinder, under stringent operation conditions of an engine. When the amount of Ni falls below the lower value, the effect of Ni fails to be obtained, whereas when the amount of Ni exceeds the upper value, effect commensurate with the additional amount of Ni is no longer obtained. In addition, when the amount of Ni is increased, since Ni is an expensive element, production costs increase.

An embodiment of the manufacturing method for a forged piston of the present invention will now be described.

The manufacturing method of the present invention includes the steps of subjecting molten aluminum alloy containing silicon in an amount of 6 to 25 mass % to unidirectional solidification casting to thereby produce a cast ingot serving as a forging material having a first surface and a second surface which are opposed to each other, the average size of silicon grains contained in the first surface differing from that of silicon grains contained in the second surface; placing the forging material in a forging die, with the surface containing silicon grains of larger average size facing a surface of the die that corresponds to a piston head, to thereby forge the forging material into a piston preform; subjecting the piston preform to intentional aging treatment; and subjecting the resultant piston preform to mechanical working.

The piston manufactured through the method of the present invention has the aforementioned characteristics.

The manufacturing method will next be described in detail.

A forging material is obtained through unidirectional solidification casting of an aluminum alloy serving as a raw material. The manufacturing method employs, for example, a casting apparatus that is disclosed in JP-A HEI 9-174198 and shown in FIG. 2.

Figure 2:
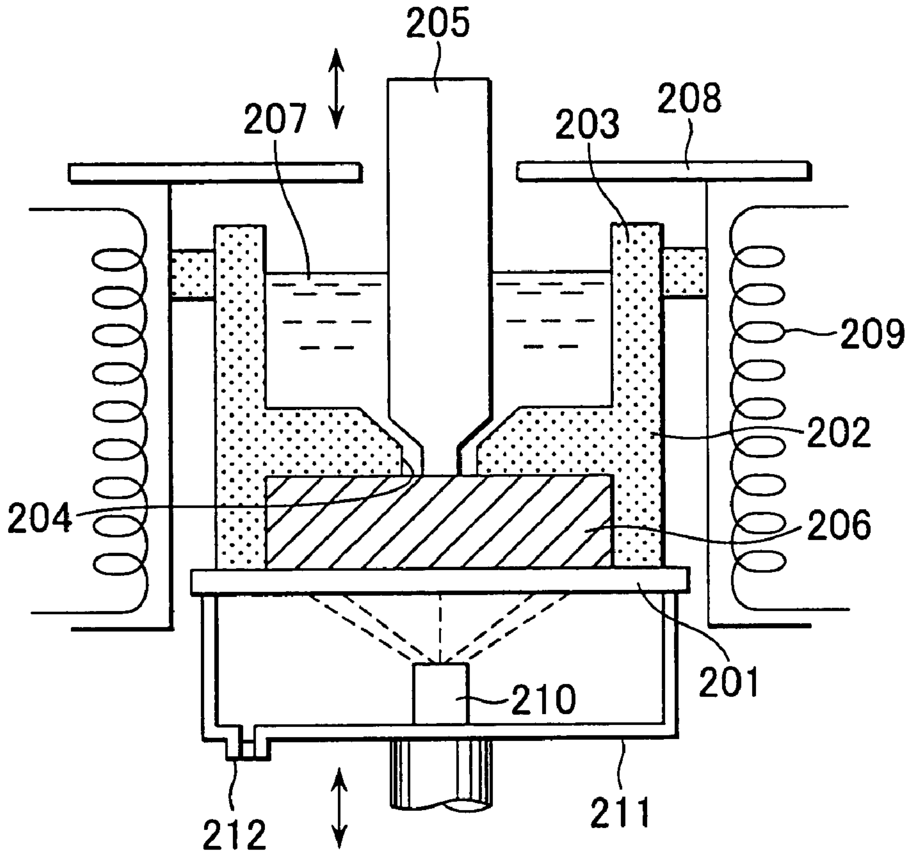
FIG. 2 is a schematic representation of an example of a casting apparatus employed for unidirectional solidification casting.

In FIG. 2, reference numeral 201 represents a cooling plate. A main mold 202 is provided on the cooling plate 201. A reservoir 203 for receiving molten aluminum alloy 207 supplied from, for example, a melting furnace (not shown) is provided on the main mold 202. As shown in FIG. 2, the bottom of the reservoir 203 serves as the ceiling of the mold 202. The reservoir 203 communicates with the main mold 202 via a molten metal inlet 204. A stopper 205 is provided on the inlet 204. The molten alloy is teemed into the mold by raising the stopper by means of an apparatus (not shown) for moving the stopper vertically, and the level of the teemed molten alloy moves upward. After completion of teeming of the molten alloy, or after elapse of a predetermined period of time, the stopper is moved downward to thereby stop teeming of the molten alloy. Reference numeral 208 represents a lid, and numeral 209 represents an electric furnace for maintaining the molten alloy at a predetermined temperature. The cooling plate 201 is cooled by spraying water, etc. thereto from a spray nozzle 210 provided below the cooling plate. Reference numerals 211 and 212 represent a casing and a drain outlet, respectively.

The molten aluminum alloy teemed into the mold is cooled by means of the cooling plate and is unidirectionally solidified toward the ceiling of the mold. As a result, a cast ingot 206 is obtained. The metallographic structure of the cast ingot 206 is affected by the cooling rate. The higher the cooling rate, the smaller the sizes of eutectic silicon grains and primary silicon crystal grains (these grains may collectively be called "silicon grains"). The lower the cooling rate, the larger the sizes of these silicon grains. When the aforementioned casting apparatus is employed, a portion close to the cooling plate attains the highest cooling rate, and a portion close to the ceiling of the mold attains the lowest cooling rate. Therefore, silicon crystal grains generated at the portion close to the cooling plate through solidification of the aluminum-silicon alloy become small, and silicon crystal grains generated at the portion close to the ceiling of the mold through solidification of the alloy become large. That is, there can be obtained a cast ingot having a metallographic structure in which the size of silicon grains is graduated.

The aluminum alloy serving as a raw material contains silicon in an amount of 6 to 25 mass %. When the amount of silicon is less than 6 mass %, wear resistance is impaired, whereas when the amount of silicon exceeds 25 mass %, wear resistance is no longer improved in commensuration with the increased amount of silicon. In addition, when the amount of silicon exceeds 25 mass %, cracking occurs during forging, meaning that forgeability is impaired. Furthermore, the service life of machining tools is considerably shortened.

Preferably, the aluminum alloy contains, in addition to silicon, Cu in an amount of 0.3 to 7 mass % and Mg in an amount of 0.1 to 2 mass % either singly or in combination. These elements age-harden the aluminum alloy to thereby enhance hardness and mechanical characteristics of the resultant piston. More preferably, the aluminum alloy contains Ag or Sc in an amount of 1.5 mass % or less.

Since a piston for an internal combustion engine is exposed to high temperature in the interior of the engine by means of heat generated through combustion of a fuel, the piston is required to exhibit strength at high temperature. Therefore, the aluminum alloy preferably contains Ni, which is generally known to improve strength at high temperature, in an amount of 0.1 to 2.0 mass %. Incorporation of Fe, Mn, Zr, Ti, W, Cr, V, Co, Mo, etc. singly or in combination is also effective.

The aluminum alloy preferably contains an element that is effective for reducing the size of eutectic silicon grains, such as Na, Ca, Sr or Sb. These elements may be incorporated singly or in combination. Incorporation of such an element is advantageous because adverse effects of large-size eutectic silicon grains on forgeability and wear of mechanical working tools can be prevented.

When primary silicon crystal grains are generated, P is generally incorporated into the aluminum alloy in order to reduce the size of the primary silicon crystal grains. However, when Na or Ca is present in the molten aluminum alloy, Na or Ca impedes the effect of P, resulting in failure to reduce the size of the primary silicon crystal grains. Therefore, the upper limit on the amount of Na or Ca in the aluminum alloy is 50 mass ppm. When the amount of Na or Ca exceeds 50 mass ppm, the primary silicon crystal grains become considerably large. As a result, forgeability is impaired, and the service life of milling tools is shortened.

The cast ingot employed in the present invention can be produced from the aforementioned molten alloy by carrying out cooling by use of the cooling plate such that the cast ingot has a metallographic structure in which the sizes of eutectic silicon grains and primary silicon crystal grains are graduated so that the grains become small at a portion close to the cooling plate and large at a portion close to the ceiling of the mold.

When a cast ingot having such a grain-size-graduated metallographic structure is produced through unidirectional solidification casting, for example, cooling is carried out to obtain the ratio (A/B) of the average size (A) of eutectic silicon grains contained in an upper portion of the cast ingot to the average size (B) of eutectic silicon grains contained in a portion of the cast ingot that is close to a cooling plate, which is at least 1.5, with the average size (A) being at least 4.0 μm.

Figure 3:
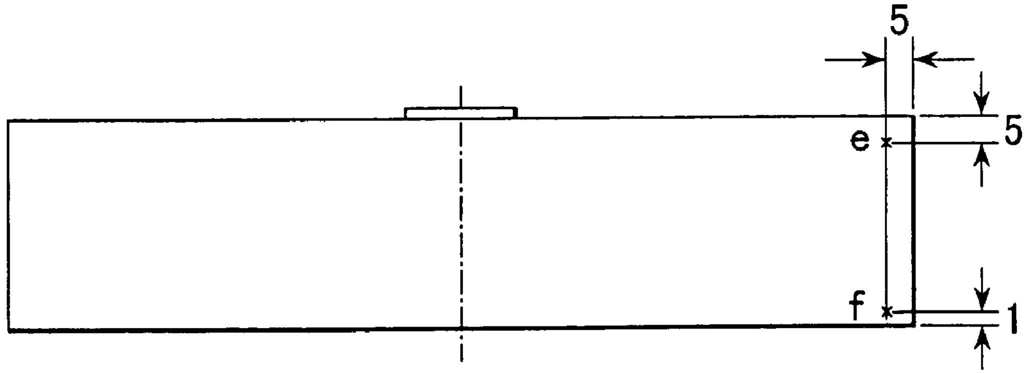
FIG. 3 is an explanatory view showing points which are provided in a mold of a unidirectional solidification apparatus and at which cooling rate is measured.

In order to produce a cast ingot having the aforementioned grain-size-graduated metallographic structure, the cooling rate may be regulated as follows. For example, during unidirectional solidification casting, as shown in FIG. 3, cooling is carried out to obtain the cooling rate (E) as measured at a point e 5 mm downward from the ceiling of a solidification mold and 5 mm inward from the side wall of the mold, which is at least 0.5° C./second, and the ratio E/F of the cooling rate (E) as measured at the point e to the cooling rate (F) as measured at a point f 1 mm upward from the bottom of the mold and 5 mm inward from the side wall of the mold, which is 0.85 or less.

When the cooling rates fall within the above ranges, a forging material having the aforementioned metallographic structure can be produced. When such a forging material is forged into a piston for an internal combustion engine, the resultant forged piston exhibits excellent forgeability, mechanical workability and wear resistance.

The cast ingot generally assumes a disk-like shape with the upper and lower surfaces parallel to each other. However, so long as the cast ingot has the aforementioned grain-size-graduated metallographic structure, the cast ingot may assume any shape in accordance with the shape of a piston to be forged. For example, the cast ingot may assume a shape with the upper and lower surfaces not parallel to each other, or a shape with either or both of the upper and lower surfaces having non-parallel protrusions and dents. The cast ingot assuming such a non-parallel shape is advantageous in that load applied to a forging die can be reduced and that a piston of complicated shape can be formed through forging.

If desired, the cast ingot may be subjected to mechanical working before forging.

If desired, the cast ingot may be subjected to milling so as to obtain a surface having a required metallographic structure, followed by forging. When the outermost surface of the cast ingot contains silicon grains of undesired average size, the cast ingot having a metallographic structure in which the average sizes of silicon grains are graduated is preferably subjected to milling until a surface containing silicon grains of desired average size is obtained, thereby employing the resultant cast ingot as a forging material.

The forging material is subjected to preliminary heating before forging. The preliminary heating is carried out at a temperature falling within a range of 350° C. to the difference obtained by deducting 10° C. from the solidus temperature (° C.) of the aluminum alloy. The forging material is preliminary heated until the temperature of the entirety of the material reaches a temperature falling within the above range and thereafter forged. When the preliminary heating is carried out at a temperature lower than 350° C., sufficient plastic flow fails to occur during hot forging of the forging material, whereas when the preliminary heating is carried out at a temperature higher than the difference, burning (local melting) may occur in the forging material. When burning occurs in the forging material, the strength of a forged product is considerably impaired, or defects attributed to local melting, such as blister and microshrinkage, are generated in the product.

Since the forging material is generally subjected to hot forging, the material is preliminarily heated, and a forging die is also heated. The heating temperature is 100 to 400° C. The heating temperature is determined in accordance with various forging parameters including the shape of a forged product, the type of forging equipment and the type of an alloy constituting the material to be forged. When the heating temperature is excessively low, the forging material is cooled with the forging die, and workability of the material is impaired, resulting in insufficient plastic flow of the material. In contrast, when the heating temperature is excessively high, the strength of the forging die is lowered, and the die tends to be worn or broken. Therefore, excessively high heating temperature is not preferred, from the viewpoint of the service life of the forging die. Preferably, forging is carried out after a lubricant is applied onto the forging die.

Figure 5:
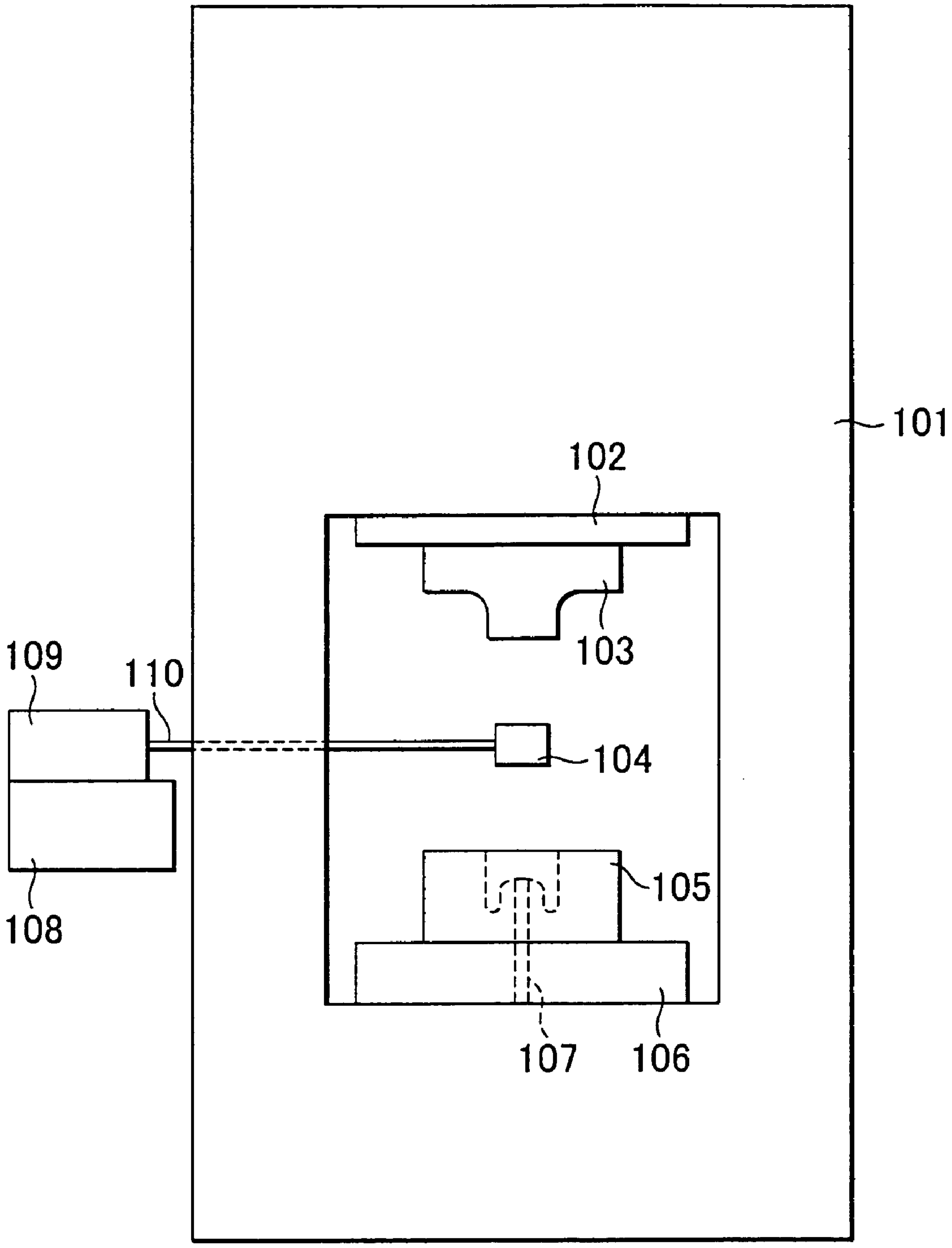
FIG. 5 is a schematic representation showing a forging apparatus employed in manufacturing the forged piston of the present invention.

The forging material is subjected to die forging. An example of the forging apparatus employed in the present invention will be described with reference to FIG. 5. The forging apparatus includes a forging machine 101, an upper die 103 mounted on an upper bolster 102, and a lower die 105 mounted on a lower bolster 106. The forging die employed in the present invention includes the upper die 103, the lower die 105 and a knockout pin 107. As shown in FIG. 5, the forging die to be employed includes the upper die 103 for forming a piston head section and the lower die 105 for forming a skirt section. However, there may be employed a forging die including a lower die for forming a piston head section and an upper die for forming a skirt section. If desired, there may be provided a lubricant application apparatus including an apparatus 108 for horizontally conveying a spray, a spray rotation apparatus 109 and a lubricant-spraying nozzle 104 that is connected to the spray-conveying apparatus 108 by means of a shaft 110.

In the present invention, the forging material is placed in the forging die, with the surface containing silicon grains of larger average size facing the surface of the die that corresponds to a piston head. For example, when the aforementioned cast ingot is subjected to forging, the cast ingot is placed in the forging die, with the upper surface of the ingot facing the surface of the die that corresponds to a piston head. When the cast ingot is placed in the forging die in an inverse manner, the frontal end portion of the resultant skirt section contains silicon grains of larger average size, and the resultant oil ring groove section contains silicon grains of smaller average size. In this case, therefore, the effects of the present invention cannot be obtained. That is, the average size of eutectic silicon grains contained in the oil ring groove section (a) becomes less than 4 μm, the average size of primary silicon crystal grains contained in the oil ring groove section becomes less than 15 μm, the ratio (A/B) of the average size (A) of the eutectic silicon grains contained in the oil ring groove section to the average size (B) of eutectic silicon grains contained in the frontal end portion of the skirt section becomes less than 1.5, and the ratio (C/D) of the average size (C) of the primary silicon crystal grains contained in the oil ring groove section to the average size (D) of primary silicon crystal grains contained in the frontal end portion of the skirt section becomes less than 1.3. As a result, the oil ring groove section fails to exhibit excellent mechanical workability and wear resistance, and the frontal end portion of the skirt section fails to exhibit excellent plastic fluidity during forging.

In the manufacturing method of the present invention, the forging material is placed in the forging die, preferably, with the surface containing silicon grains of larger average size facing the surface of the die that corresponds to a piston head, and the frontal end portion of the skirt section preferably contains eutectic silicon grains having an average size of 3 μm or less. The average size is advantageous in that the frontal end portion exhibits excellent workability during hot forging. That is, in the case where the frontal end portion of the skirt section contains eutectic silicon grains having an average size of 3 μm or less, even when the thickness of the skirt section is reduced during forging, cracking is not generated in the frontal end portion which is placed in the forging die, and die-filling property of the frontal end portion is not impaired.

The resultant as-forged piston preform may be subjected to mechanical working. However, preferably, the piston preform is subjected to heat treatment such as intentional aging treatment, since mechanical characteristics of the preform formed from an alloy containing Cu, Mg, Sc, Ag, etc. are improved through the heat treatment. In the intentional aging treatment, preferably, the piston preform is subjected to solid solution treatment, in which immediately after the piston preform is heated at 400 to 550° C. for 0.2 to 10 hours it is subjected to water-quenching, and then subjected to tempering at 150 to 250° C. for 0.2 to 20 hours. Through the intentional aging treatment, the preform can attain enhanced hardness, mechanical characteristics (e.g., tensile strength and 0.2% yield strength), and fatigue strength.

Thereafter, the resultant forged piston preform is subjected to mechanical working that includes, for example, working for forming a piston pinhole, milling of a piston surface and working for forming oil ring grooves, to thereby manufacture a final product (a forged piston for an internal combustion engine).

In the manufacturing method of the present invention, since the forging material is placed in the forging die, with the surface containing silicon grains of larger average size facing the surface of the die that corresponds to a piston head, the average size (A) of eutectic silicon grains contained in the oil ring groove section becomes at least 4 μm, the average size (C) of the primary silicon crystal grains contained in the oil ring groove section becomes at least 15 μm, the ratio (A/B) of the average size (A) to the average size (B) of eutectic silicon grains contained in the frontal end portion of the skirt section becomes at least 1.5, and the ratio (C/D) of the average size (C) of the primary silicon crystal gains contained in the oil ring groove section to the average size (D) of primary silicon crystal grains contained in the frontal end portion of the skirt section becomes at least 1.3. As a result, when the oil ring groove section is subjected to milling, entanglement of elongated-form chips in milling tools and the chuck of a milling machine can be prevented. Therefore, generation of scratches on the surface of the piston to be milled can be prevented. In addition, there can be prevented accumulation of chips in the form of filamentary mass on the bottom of the milling machine, and covering of the entirety of the chuck with the chips. Therefore, productivity is improved.

The skirt section is not continuous along the entire periphery of the piston, and is segmented by the piston pinhole in which a piston pin for connecting the piston to a connecting rod is inserted. Therefore, milling of the skirt section is carried out in a discontinuous manner, thereby preventing entanglement of chips in milling tools. Therefore, satisfactory manageability of chips during milling can be attained, so long as the average size (B) of eutectic silicon grains contained in the frontal end portion of the skirt section is 0.67 times or less the average size (A) of eutectic silicon grains contained in the oil ring groove section, and the ratio (C/D) of the average size (C) of primary silicon crystal grains contained in the oil ring groove section to the average size (D) of primary silicon crystal grains contained in the frontal end portion of the skirt section is at least 1.3.

Since a skirt section of decreased thickness can be formed through forging, mechanical working (milling) for reducing the thickness of the skirt section is not required, or the amount of allowance required for mechanical working can be reduced. Therefore, yield of the piston on the basis of the material can be enhanced. In addition, since the time required for mechanical working is shortened, productivity is improved.

Preferably, the forging material is subjected to homogenizing treatment before hot forging in order to improve forgeability of the material and intentional aging of a forged piston preform. In the homogenizing treatment, the forging material is heated at high temperature so as to uniformly distribute an additive metal, such as Cu or Mg, in the aluminum matrix. The metal is added to the forging material for enhancing the mechanical strength of a piston to be formed and the strength of the piston upon use in an engine at high temperature and is microsegregated during casting. Through the homogenizing treatment, forgeability of the forging material can be secured, and uniformity of mechanical characteristics of a forged piston preform that has undergone intentional aging can be attained. The homogenizing treatment may be carried out for 1 to 30 hours at a temperature falling within a range of 400° C. to the difference obtained by deducting 10° C. from the solidus temperature (° C.) of an alloy to be employed.

Depending on the type of an alloy to be employed or the shape of a piston to be formed, preliminary heating of the forging material carried out before forging may exert effects similar to those obtained through the homogenizing treatment of the forging material. For example, when the forging material is subjected to the preliminary heating for one hour or longer, effects similar to those obtained through the homogenizing treatment can be obtained. Meanwhile, depending on the type of an alloy to be employed or the shape of a piston to be formed, heat treatment of a forged piston preform carried out after forging may exert effects similar to those obtained through the homogenizing treatment of the forging material. For example, when the forged piston preform is subjected to solid solution treatment for a long period of time during intentional aging, effects similar to those obtained through the homogenizing treatment can be obtained.

The effects of the present invention will next be described in detail with reference to Examples employing a forging material formed through unidirectional solidification casting, a forging material formed through continuous casting and a forging material formed through permanent mold casting.

EXAMPLES 1 AND 2

An alloy 1 having a solidus temperature of 549° C. shown in Table 1 was subjected to unidirectional solidification casting by use of the apparatus shown in FIG. 2 to thereby form a cast ingot (outer diameter: 77 mm, thickness: 30 mm) serving as a forging material (Example 1). An alloy 2 having a solidus temperature of 528° C. shown in Table 1 was subjected to unidirectional solidification casting by use of the apparatus shown in FIG. 2 to thereby form a cast ingot (outer diameter: 110 mm, thickness: 30 mm) serving as a forging material (Example 2). The casting conditions are shown in Table 2. In each of Examples 1 and 2, K-type thermocouples were provided at the points of the mold shown in FIG. 3 to thereby measure the cooling rate of the cast ingot during solidification.

Each of the above-formed forging materials was subjected to homogenizing treatment at 490° C. for eight hours, and then forged into a piston preform through hot forging by use of the forging apparatus shown in FIG. 5. The forging material was placed in the forging die of the forging apparatus such that the upper surface of the forging material (cast ingot) that is the surface of the cast ingot that does not face the cooling plate of the casting apparatus was forged into a piston head and such that the bottom surface of the cast ingot that is the surface of the cast ingot that faces the cooling plate of the casting apparatus was forged into a skirt. The forging conditions are shown in Table 3.

In Example 1, the outer diameter of the forged piston preform produced was 78 mm, the thickness of the skirt section of the preform was 3.5 mm, and the forging load during forging was 430 t. In Example 2, the outer diameter of the forged piston preform produced was 111 mm, the thickness of the skirt section of the preform was 4 mm, and the forging load during forging was 670 t.

Formability of the skirt section of each of the piston preforms was evaluated through visual observation of cracking generated in the same direction as that of plastic flow, underfill caused by insufficient plastic flow of the frontal end portion of the skirt section during forging, and generation of hairline cracks.

The resultant piston preform was subjected to intentional aging treatment under the conditions shown in Table 4.

The hardness of the resultant piston preform was measured by use of a Rockwell hardness meter. The average size of eutectic silicon grains contained in the oil ring groove section was measured, the average size of eutectic silicon grains contained in the frontal end portion of the skirt section was measured, and the ratio of the former average size to the latter average size was calculated. Furthermore, the average size of primary silicon crystal grains contained in the oil ring groove section was measured, the average size of primary silicon crystal grains contained in the frontal end portion of the skirt section was measured, and the ratio of the former average size to the latter average size was calculated. For comparison, the maximum chord length (MAXLNG) of each silicon grain was measured by use of an image analyzer.

In the present invention, a prepared sample is observed under a microscope by means of a metallographic structure observation technique, and the observed surface is subjected to image analysis by use of an image analysis processor. The average of the circle-equivalent diameters (HEYWOOD diameter that is obtained by reducing the average cross section of grains found in the observed surface to the area of a circle and representing the diameter of the circle as the grain diameter) is regarded as the average grain size.

Maximum chord length refers to the maximum length of a silicon grain as measured by use of a vernier caliper. When two silicon crystal grains have the same HEYWOOD diameter, and one of the grains has a larger MAXLNG, the silicon crystal grain of larger MAXLNG assumes a flat shape or an acicular shape.

Figure 4A:
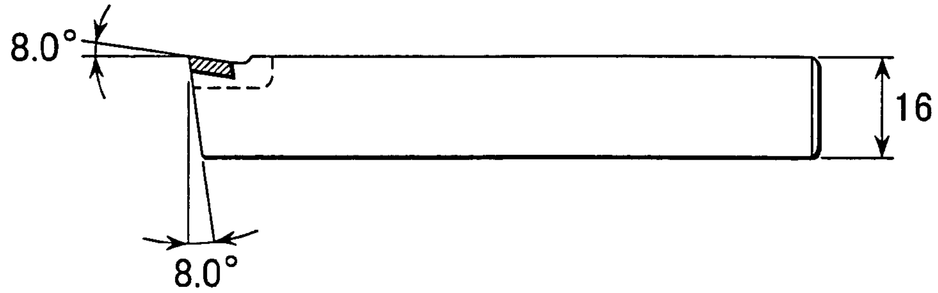
FIG. 4(*a*) is a side view of a Compax milling tool employed for milling testing.
Figure 4B:
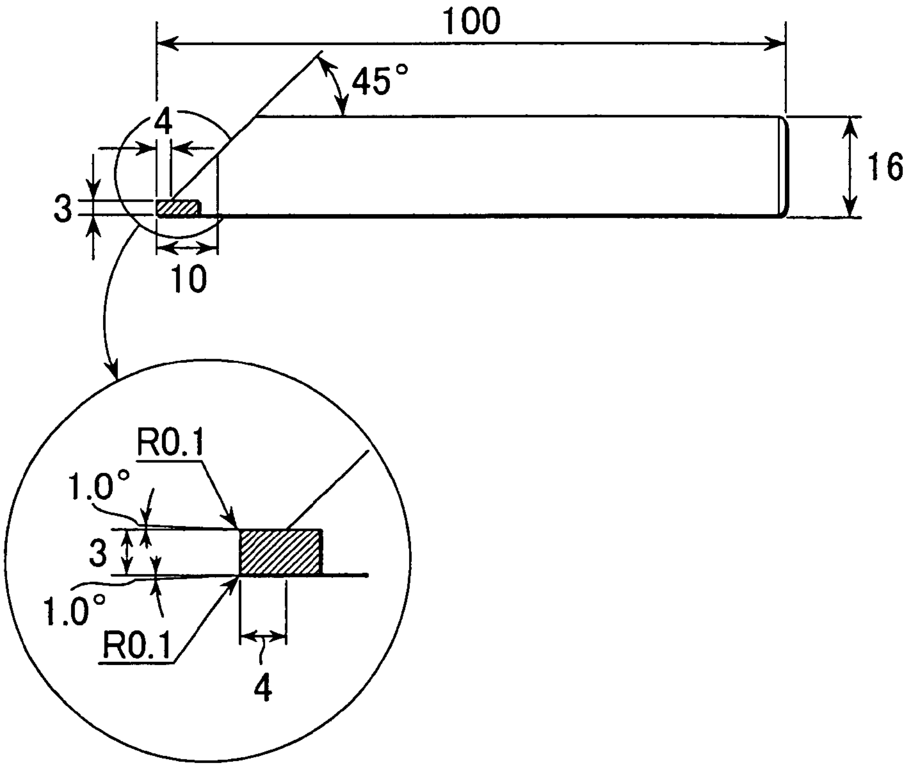
Figure 4C:
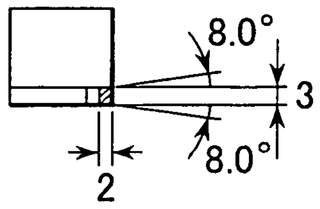

The oil ring groove section of the resultant piston preform was subjected to milling testing under the conditions shown in Table 5, and chips were evaluated in terms of shape and manageability. Subsequently, the surface roughness of the inner wall of the oil ring groove was evaluated under the conditions shown in Table 6. A Compax milling tool (artificial-diamond-made milling tool) as shown in FIG. 4 was employed for milling testing. By use of a surface roughness meter, the surface roughness of the oil ring groove of the piston preform was measured in a direction parallel to the milling direction (i.e., in a direction parallel to the piston head surface).

Subsequently, a test piece was obtained from the vicinity of the oil ring groove and then subjected to pin-on-disk friction-wear testing at ambient temperature under the conditions shown in Table 7 to thereby measure the amount of wear of a pin.

Table 8 shows the results of the above measured cooling rates. Table 9 shows the average sizes of eutectic silicon grains and primary silicon crystal grains contained in the cast ingot. Table 12 shows the hardness (HRB) of the piston preform, formability of the skirt section, the shape of chips generated from the oil ring groove section, manageability of the chips, the surface roughness of the inner wall of the oil ring groove, and the amount of wear of a test piece obtained from the vicinity of the oil ring groove section.

COMPARATIVE EXAMPLES 1 AND 2

A continuously cast bar 82 mm in diameter was formed from an alloy 1 shown in Table 1 (Comparative Example 1), and a continuously cast bar 115 mm in diameter was formed from an alloy 2 shown in Table 1 (Comparative Example 2). Continuous casting was carried out by means of an air-pressurized hot top casting process disclosed in JP-B SHO 54-42847 under the conditions shown in Table 10. In comparative Example 1, the resultant cast ingot was subjected to homogenizing treatment at 495° C. for eight hours and then to machining to thereby reduce the diameter to 77 mm. In Comparative Example 2, the resultant cast ingot was identically treated to thereby reduce the diameter to 110 mm. Thereafter, each of the cast ingots was cut into pieces having a thickness of 30 mm, and the resultant piece was employed as a forging material. In Comparative Examples 1 and 2, the forging materials were subjected to forging under the same conditions as in Examples 1 and 2, respectively. However, during forging, the respective forging materials were placed in a forging die in a manner different from that as described in Example 1 or 2. In Comparative Examples 1 and 2, the resultant forged piston preforms were subjected to intentional aging treatment and then to mechanical working under the same conditions as in Examples 1 and 2, respectively.

Table 11 shows the measurement results of the average size of eutectic silicon grains and that of primary silicon crystal grains. Table 12 shows the results of evaluation carried out in a manner similar to that of Example 1 or 2.

TABLE 1

| | Si | Cu | Mg | Ni | Fe | Mn | Ti | Sr | Ca | P |
|---|---|---|---|---|---|---|---|---|---|---|
| | | | | | | | | | | (mass %) |
| Alloy 1 | 9.6 | 3.0 | 0.46 | — | 0.18 | — | — | 0.005 | — | — |
| Alloy 2 | 19.2 | 1.1 | 1.10 | 0.9 | 0.44 | 0.40 | 0.13 | — | 0.002 | 0.010 |

TABLE 2

| Items | Example 1 | Example 2 |
|---|---|---|
| 1. Temperature of molten alloy as measured in molten alloy reservoir | 740° C. | 800° C. |
| 2. Material of the mold and the molten alloy reservoir | Lumiboard | Lumiboard |
| 3. Difference in height between the ceiling of the mold and the level of molten alloy in the molten alloy reservoir | 150 mm | 150 mm |
| 4. Temperature of the cooling plate before teeming | 100° C. | 200° C. |
| 5. Cooling water amount | 6 L/min | 7 L/min |
| 6. Diameter of the molten alloy inlet | 12 mm | 10 mm |
| 7. Atmospheric temperature within electric furnace | 770° C. | 820° C. |
| 8. Temperature of upper portion of the ceiling and side wall of the mold | 680° C. | 700° C. |
| 9. Casting procedure | | |
| 1) Teeming | Closure of stopper after 15 sec. | Closure of stopper after 17 sec. |
| 2) Cooling start conditions | Starting of water cooling at 500° C. | Starting of water cooling at 500° C. |
| 3) Cooling completion conditions | Completion of water cooling at 100° C. | Completion of water cooling at 100° C. |
| 4) Cooling plate operation | Descending of cooling plate at 150° C. | Descending of cooling plate at 250° C. |
| 5) Removal of material | Spontaneous falling | Spontaneous falling |

TABLE 3

| Items | Example 1 | Example 2 |
|---|---|---|
| 1. Forging machine | 630-t mechanical press | 800-t mechanical press |
| 2. Forging die temperature | | |
| 1) Punch temperature | 150° C. | 170° C. |
| 2) Die temperature | 250° C. | 300° C. |
| 3. Type of lubricating oil | Graphite lubricating oil | Same as the left |
| 4. Preliminary heating temperature of forging material | 400° C. | 450° C. |

TABLE 4

| Items | Example 1 | Example 2 |
|---|---|---|
| 1. Solid solution treatment conditions | | |
| 1) Heating temperature | 495° C. | 505° C. |
| 2) Maintenance temperature | 2 hours | 2 hours |

TABLE 4-continued

| Items | Example 1 | Example 2 |
|---|---|---|
| 2. Tempering conditions | | |
| 1) Heating temperature | 200° C. | 180° C. |
| 2) Maintenance temperature | 6 hours | 10 hours |

TABLE 5

| | Example 1 | Example 2 |
|---|---|---|
| 1. Milling tool type | Compax tool Nose radius R2 mm | Same as the left |
| 2. Revolution | 600 rpm | 400 rpm |
| 3. Feed | 0.5 mm/rev | Same as the left |
| 4. Cut depth | 0.2 mm | Same as the left |
| 5. Type of milling oil | Water-soluble milling oil | Same as the left |
| 6. Position of evaluation of chips | Around oil ring groove | Same as the left |

TABLE 6

| | Example 1 | Example 2 |
|---|---|---|
| 1. Milling tool type | As shown in FIG. 4 | Same as the left |
| 2. Revolution | 600 rpm | 400 rpm |
| 3. Cut depth | 0.06 mm/rev | Same as the left |
| 4. Type of milling oil | Water-soluble milling oil | Same as the left |

TABLE 7

| Items | Details |
|---|---|
| 1) Test apparatus | Wear tester Model TRI-S500 (Takachiho Seiki) |
| 2) Test method | Pin-on-disk method |
| 3) Disc material | ADC12 Die cast material |
| 4) Lubricating oil | Mission oil |
| 5) Load applied | 5 kgf |
| 6) Sliding rate | 0.25 m/sec |
| 7) Sliding time | 60 minutes |
| 8) Shape of pin | φ 7.9 mm - h 20 mm |

TABLE 8

| | Position of measurement | Measurement value | Example 1 | Example 2 |
|---|---|---|---|---|
| Cooling rate | e | E | 2.6 | 4.1 |
| ° C./sec | f | F | 6.2 | 5.5 |
| Ratio | | E/F | 0.42 | 0.75 |

TABLE 9

| | Position of measurement | Measurement value | Example 1 HEYWOOD diameter | Example 1 MAXLNG | Example 2 HEYWOOD diameter | Example 2 MAXLNG |
|---|---|---|---|---|---|---|
| Average size of eutectic silicon grains µm | Oil ring groove section | A | 4.7 | 7.8 | 6.9 | 15.1 |
| | Frontal end portion of skirt section | B | 2.3 | 2.7 | 2.8 | 3.9 |
| Ratio | | A/B | 2.0 | 3.0 | 2.5 | 3.9 |
| Average size of primary silicon crystal grains µm | Oil ring groove section | C | | | 23.9 | 34.4 |
| | Frontal end portion of skirt section | D | | | 15.7 | 18.6 |
| Ratio | | C/D | | | 1.5 | 1.9 |

TABLE 10

| | Comparative Example 1 | Comparative Example 2 |
|---|---|---|
| 1. Diameter of cast ingot | 82 mm | 115 mm |
| 2. Header overhang length | 10 mm | Same as the left |
| 3. Temperature of molten alloy | 720° C. | 820° C. |
| 4. Casting speed | 200 mm/min | 180 mm/min |
| 5. Cooling water amount | 15 L/min | 25 L/min |
| 6. Type of lubricating oil | Castor oil | Same as the left |
| 7. Flow rate of lubricating oil | 0.4 cc/min | 0.1 cc/min |
| 8. Type of gas | Air | Air |
| 9. Flow rate of gas | 0.5 L/min | 0.1 L/min |

TABLE 11

| | Position of measurement | Meas-urement value | Comparative Example 1 | Comparative Example 2 |
|---|---|---|---|---|
| Average size of eutectic silicon | Oil ring groove section | A | 2.0 | 2.6 |

TABLE 11-continued

| | Position of measurement | Meas-urement value | Comparative Example 1 | Comparative Example 2 |
|---|---|---|---|---|
| grains (HEYWOOD diameter: µm) | Frontal end portion of skirt section | B | 2.0 | 2.5 |
| Ratio | | A/B | 1.0 | 1.0 |
| Average size of primary silicon crystal grains (HEYWOOD diameter: µm) | Oil ring groove section | C | | 17.7 |
| | Frontal end portion of skirt section | D | | 18.3 |
| Ratio | | C/D | | 1.0 |

TABLE 12

| | Example 1 | Example 2 | Comparative Example 1 | Comparative Example 2 |
|---|---|---|---|---|
| 1. Hardness of cross section of piston (HRB) | 75 | 69 | 74 | 68 |
| 2. Formability of skirt section | ○ | ○ | ○ | ○ |
| 3. Shape of chips of ring groove section | Fragmented shape | Fragmented shape | Elongated shape | Elongated shape |
| 4. Manageability of chips of ring groove section | ○ | ○ | X | X |
| 5. Surface roughness of inner wall of ring groove (Ra: µm) | 0.9 | 1.1 | 3.5 | 5.4 |
| 6. Amount of wear of ring groove section test piece (µm) | 19 | 3 | 34 | 7 |
| General Evaluation | ○ | ○ | X | X |

Evaluation criteria of formability of skirt section

| Items | No | Yes |
|---|---|---|
| 1. Cracking of skirt section | ○ | X |
| 2. Underfill of frontal end portion of skirt section | ○ | X |
| 3. Hair crack of frontal end portion of skirt section | ○ | X |

TABLE 12-continued

| | Evaluation of shape of chips | |
|---|---|---|
| | Fragmented shape | Elongated shape |
| Shape of chips | 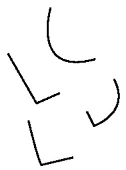 | 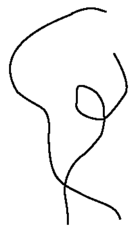 |
| Evaluation criteria | ○ | X |

As is clear from Table 8, in Example 1, which employs the forging material formed through casting under the conditions that the cooling rate as measured at point e is 2.6° C./sec and that the ratio (E/F) is 0.42, no primary silicon crystal grain is present in the forging material; the average sizes of eutectic silicon grains (HEYWOOD diameter) contained in the oil ring groove section and in the frontal end portion of the skirt section are 4.7 μm and 2.3 μm, respectively; and the ratio (A/B) is 2. As is clear from Table 11, in Comparative Example 1, which employs the continuously cast bar of small diameter formed from the alloy 1, the average sizes of eutectic silicon grains contained in the oil ring groove section and in the frontal end portion of the skirt section are 2.0 μm and 2.0 μm, respectively; and the ratio (A/B) is 1, meaning that the piston preform has no metallographic structure in which the silicon grain size is graduated in a thickness direction: The average size of eutectic silicon grains contained in the oil ring groove section of the piston preform of Comparative Example 1 is smaller than that of eutectic silicon grains contained in the oil ring groove section of the piston preform of Example 1. As is clear from Table 12, in each of Example 1 and Comparative Example 1, formability of the skirt section is excellent. In Example 1, chips generated from the oil ring groove section assume a fragmented shape. In contrast, in Comparative Example 1, chips generated from the oil ring groove section assume an elongated shape, from which it is noted that manageability of the chips is poor. In Comparative Example 1, the inner wall of the oil ring groove has a large surface roughness, and the oil ring groove section exhibits poor wear resistance. In general, when the inner wall of an oil ring groove has a large surface roughness, the oil ring groove is worn by a piston ring, and the oil ring groove becomes large. As a result, the piston ring is obliquely mated with the oil ring groove, which raises problems including occurrence of galling on the inner wall of a cylinder. When the clearance between a piston and a cylinder becomes large due to poor wear resistance of the oil ring groove section, consumption of engine oil becomes high, and the piston and the cylinder fail to be mated with each other in a hermetic manner, thereby lowering engine output. Therefore, when the piston preform of Comparative Example 1 is formed into a piston, the resultant piston is considered to exhibit unsatisfactory characteristics.

Comparison between Example 2 and Comparative Example 2 reveals the following. In Example 2, the cooling rate as measured at point e is 4.1° C./sec, and the ratio (E/F) is 0.75. In Example 2, the average size (A) of eutectic silicon grains contained in the oil ring groove section is 6.9 μm; the average size (B) of eutectic silicon grains contained in the frontal end portion of the skirt section is 2.8; the ratio (A/B) is 2.5; the average size (C) of primary silicon crystal grains contained in the oil ring groove section is 23.9 μm; the average size (D) of primary silicon crystal grains contained in the frontal end portion of the skirt section is 15.7 μm; and the ratio (C/D) is 1.5. As is clear from Table 11, in Comparative Example 2, the average size (A) of eutectic silicon grains contained in the oil ring groove section is 2.6 μm; the average size (B) of eutectic silicon grains contained in the frontal end portion of the skirt section is 2.5 μm; the ratio (A/B) is 1.0; the average size (C) of primary silicon crystal grains contained in the oil ring groove section is 17.7 μm; the average size (D) of primary silicon crystal grains contained in the frontal end portion of the skirt section is 18.3 μm; and the ratio (C/D) is 1.0, meaning that the piston preform has no metallographic structure in which the silicon grain size is graduated in a thickness direction. As described above, the average sizes of eutectic silicon grains and primary silicon crystal grains contained in the oil ring groove section of the piston preform of Comparative Example 2 are smaller than those of eutectic silicon grains and primary silicon crystal grains contained in the oil ring groove section of the piston preform of Example 2. In each of Example 2 and Comparative Example 2, formability of the skirt section is excellent. In Example 2, chips generated from the oil ring groove section assume a fragmented shape. In contrast, in Comparative Example 2, chips generated from the oil ring groove section assume an elongated shape, and therefore the chips have poor manageability, and the inner wall of the oil ring groove has a large surface roughness. In Comparative Example 2, since the average sizes of eutectic silicon grains and primary silicon crystal grains contained in the oil ring groove section are small, chips generated from the section assume an elongated shape, manageability of the chips is poor, the surface roughness of the inner wall of the oil ring groove is large, and the amount of wear of a test piece obtained from the oil ring groove section is large.

COMPARATIVE EXAMPLE 3

Piston preforms were produced, through permanent mold casting, from alloys 1 and 2 shown in Table 1. Comparative Example 3 employed two types of casting molds, namely type A (thickness of a portion corresponding to a skirt section: 3.5 mm) and type B (thickness of a portion corresponding to a skirt section: 6 mm). These two molds are identical in shape with the forging die employed in Example 1. The A-type and B-type molds are identical in inner diameter and shape.

Piston preforms were produced through casting by use of the A-type and B-type molds under the casting conditions shown in Table 13. The resultant piston preforms were evaluated in terms of soundness of a skirt section. The results are shown in Table 14. Table 15 shows the results of measurement of the average sizes of eutectic silicon grains and primary silicon crystal grains.

TABLE 13

| | Alloy 1 | Alloy 2 |
|---|---|---|
| 1. Casting temperature | 720° C. | 810° C. |
| 2. Mold temperature | 400° C. | 420° C. |
| 3. Mold coating agent | Die coat | Same as the left |
| 4. Riser height | 200 mm | Same as the left |

TABLE 14

| Thickness of skirt section | Alloy 1 | Alloy 2 |
|---|---|---|
| 3.5 mm | X | X |
| 6.0 mm | ○ | ○ |

Legend:
○: No underfill at the skirt section
X: Occurrence of defects attributed to misrun of the skirt section

TABLE 15

| | Position of measurement | Measurement value | HEYWOOD diameter Alloy 1 | HEYWOOD diameter Alloy 2 | MAXLNG Alloy 1 | MAXLNG Alloy 2 |
|---|---|---|---|---|---|---|
| Average size of eutectic silicon grains μm | Oil ring groove section | A | 3.6 | 5.1 | 6.4 | 8.8 |
| | Frontal end portion of skirt section | B | 3.6 | 5.2 | 6.5 | 8.8 |
| | Ratio | A/B | 1.0 | 1.0 | 1.0 | 1.0 |
| Average size of primary silicon crystal grains μm | Oil ring groove section | C | | 16.8 | | 26.2 |
| | Frontal end portion of skirt section | D | | 16.8 | | 25.9 |
| | Ratio | C/D | | 1.0 | | 1.0 |

The results in Table 14 show that, when a piston preform including a skirt section having a thickness of 3.5 mm that is the same as that of the skirt section of the forged piston perform is formed from either of alloys 1 and 2 through permanent mold casting, underfill occurs at the frontal end portion of the skirt section due to misrun, and the resultant preform fails to exhibit a quality comparable to that of the forged piston preform. The results also show that, when the thickness of the skirt section is 6 mm, the skirt section exhibits soundness. As described above, the piston preform formed through permanent mold casting fails to exhibit characteristics similar to those of the forged piston preform. Since the average sizes of eutectic silicon grains and primary silicon crystal grains contained in the oil ring groove section of the piston preform of Comparative Example 3 are nearly equal to those of the eutectic silicon grains and primary silicon crystal grains contained in the oil ring groove section of the piston preform of Example 1 or 2, the oil ring groove section of the piston preform of Comparative Example 3 is considered to exhibit good millability. In the case of Comparative Example 3, however, since the thickness of the skirt section cannot be reduced and a large amount of milling allowance is required, high productivity cannot be attained.

COMPARATIVE EXAMPLE 4

Alloy 2 shown in Table 1 was melted in a melting apparatus, and the resultant molten alloy was teemed into a cylindrical iron mold (outer diameter: 300 mm, full length: 350 mm, inner diameter: 115 mm, depth: 250 mm) to thereby form a cylindrical cast ingot having an outer diameter of 115 mm (length of a sound portion of the cast ingot that contains no cavity: 150 mm). During casting, the temperature of the molten alloy was maintained at 800° C., and the mold was preliminarily heated to 300° C. The resultant cylindrical cast ingot was subjected to homogenizing treatment at 490° C. for eight hours. Subsequently, the periphery of the cast ingot was subjected to machining so as to remove an unsound portion, thereby forming a round bar having an outer diameter of 110 mm. The round bar was cut into pieces having a thickness of 30 mm, and the resultant pieces were employed as forging materials.

Piston preforms were produced through hot forging using two types of forging dies, pistons obtained from which have the same outer diameter, namely type C (thickness of a portion corresponding to a skirt section: 4.0 mm) and type D (thickness of a portion corresponding to a skirt section: 6 mm). The forging materials were preliminarily heated to 450° C. before hot forging. Formability of the skirt sections of the resultant piston preforms was evaluated. Hot forging was carried out under the same conditions as in Example 2 shown in Table 3. The results are shown in Table 16. A test piece was obtained from the frontal end portion of the skirt section of each of the preforms, and the metallographic structure of the test piece was observed to thereby measure the average sizes of eutectic silicon grains and primary silicon crystal grains. The results are shown in Table 17.

TABLE 16

| Thickness of skirt section | 4 mm | 6 mm |
|---|---|---|
| Evaluation of soundness of skirt section | X | ○ |
| Note | Cracking at skirt section | |

TABLE 17

| Frontal end portion of skirt section | |
|---|---|
| Average size of eutectic silicon grains | 8.7 μm |
| Average size of primary silicon crystal grains | 33.4 μm |

Average size: HEYWOOD diameter

The results show that, when the average size of eutectic silicon grains or primary silicon crystal grains is large, forgeability is lowered, and a final product exhibiting excellent wear resistance and chip-fragmentability may fail to be produced. The results also show that, when the average size of eutectic silicon grains or primary silicon crystal grains is large, as in the case of permanent mold casting, a skirt section of large thickness must be formed during forging, and then the skirt section must be subjected to mechanical working to thereby reduce the thickness of the skirt section.

INDUSTRIAL APPLICABILITY

As described above, according to the present invention, there can be produced a forged piston for an internal combustion engine including an oil ring groove section and a skirt section, in which the average sizes of eutectic silicon grains and primary silicon crystal grains contained in the frontal end portion of the skirt section are small, and the average sizes of these silicon grains contained in the oil ring groove section are large. The skirt section exhibits excellent forgeability as in the case of a skirt section of a piston formed from a continuously cast bar of small diameter, and thus the thickness of the skirt section can be reduced. In addition, the oil ring groove section exhibits excellent manageability of chips during milling as in the case of an oil ring groove section of a piston formed through casting, and the oil ring groove has a small surface roughness and exhibits excellent wear resistance.

The forged piston as described above cannot be produced through hot forging using a conventional continuously cast bar of small diameter, or through permanent mold casting. However, the present invention can provide a forged piston for an internal combustion engine that has advantages derived from hot forging and permanent mold casting.

The forged piston of the present invention is manufactured from a material obtained through unidirectional solidification casting by means of a manufacturing method employing hot forging and intentional aging treatment in combination.

The aluminum alloy employed in the present invention may contain, in addition to primary additive elements (i.e., Si, Cu and Mg), an element for further improving intentional-age-hardening property, such as Ag or Sc, and an element for improving heat resistance, such as Fe, Ni, Ti, Cr, V, Zr, Mn, Co, Nb or Mo. These elements may be incorporated singly or in combination. Through incorporation of such an element, characteristics of the oil ring groove section, skirt section, head surface and piston pin section can be more improved as compared with other sections.

Thus, an inexpensive forged piston of high performance can be provided, and high-performance engines of uniform quality can be provided.

The invention claimed is:

1. A forged piston for an internal combustion engine formed from an aluminum alloy containing silicon in an amount of 6 to 25 mass %, the piston comprising an oil ring groove section and a skirt section, wherein a ratio (A/B) of an average size (A) of eutectic silicon grains contained in the oil ring groove section to an average size (B) of eutectic silicon grains contained in a frontal end portion of the skirt section, is at least 1.5, and the average size (A) is at least 4 μm.

2. The forged piston according to claim 1, wherein a ratio (C/D) of an average size (C) of primary silicon crystal grains contained in the oil ring groove section to an average size (D) of primary silicon crystal grains contained in the frontal end portion of the skirt section is at least 1.3, and the average size (C) is at least 15 μm.

3. The forged piston according to claim 1 or claim 2, wherein the aluminum alloy contains Cu in an amount of 0.3 to 7 mass % and Mg in an amount of 0.1 to 2 mass %.

4. The forged piston according to any one of claim 1 to claim 2, wherein the aluminum alloy contains Ni in an amount of 0.1 to 2.5 mass %.

5. A method for manufacturing a forged piston for an internal combustion engine, comprising the steps of:

subjecting to unidirectional solidification casting molten aluminum alloy containing silicon in an amount of 6 to 25 mass % to thereby produce a cast ingot which serves as a forging material having a first surface and a second surface which are opposed to each other, an average size of silicon grains contained in the first surface differing from that of silicon grains contained in the second surface;

subjecting the forging material to preliminary heating;

placing the forging material in a forging die, with the surface containing silicon grains of larger average size facing a surface of the die that corresponds to a piston head, to thereby forge the forging material into a piston preform;

subjecting the piston preform to intentional aging treatment; and subjecting the resultant piston preform to mechanical working to thereby manufacture a forged piston for an internal combustion engine.

6. The method according to claim 5, wherein the unidirectional solidification casting comprises cooling carried out to obtain a ratio (A/B) of an average size (A) of eutectic silicon grains contained in an upper portion of the cast ingot to a average size (B) of eutectic silicon grains contained in a portion of the cast ingot that is close to a cooling plate, which ratio (A/B) is at least 1.5, the average size (A) being at least 4 μm.

7. The method according to claim 5, wherein the unidirectional solidification casting comprises cooling carried out under a cooling rate (E) as measured at a point e 5 mm downward from a ceiling of a solidification mold and 5 mm inward from a side wall of the solidification mold, which cooling rate (E) is at least 0.5° C./second, to obtain a ratio (E/F) of the cooling rate (E) as measured at the point e to a cooling rate (F) as measured at a point f 1 mm upward from a bottom of the solidification mold and 5 mm inward from the side wall of the solidification mold, which ratio (E/F) is 0.85 or less.

8. The method according to any one of claim 5 to claim 7, wherein the preliminary heating is carried out at a temperature falling within a range of 350° C. to the difference obtained by deducting 10° C. from the solidus temperature of the aluminum alloy.

* * * * *